(12) United States Patent
Shimokoriyama

(10) Patent No.: US 6,993,072 B1
(45) Date of Patent: Jan. 31, 2006

(54) DIGITAL SIGNAL CODING APPARATUS

(75) Inventor: Makoto Shimokoriyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/778,254

(22) Filed: Jan. 8, 1997

Related U.S. Application Data

(63) Continuation of application No. 08/301,053, filed on Sep. 6, 1994.

(30) Foreign Application Priority Data

Sep. 17, 1993 (JP) .................................. 5-255109

(51) Int. Cl.
*H04B 1/66* (2006.01)

(52) U.S. Cl. .................................. 375/240.01; 386/39

(58) Field of Classification Search ................ 348/405, 348/419, 400.1, 409.1; 358/341, 343, 906, 358/335; 360/8, 9.1, 32, 48, 61; 375/240, 375/240.9, 240.02, 240.03, 240.23, 240.01; 386/111, 112, 109, 110, 39, 96, 97, 98, 101, 386/105, 106
See application file for complete search history.

(56) References Cited

U.S. PATENT DOCUMENTS

| | | | | |
|---|---|---|---|---|
| 5,032,927 A | * | 7/1991 | Watanabe et al. | ............ 358/343 |
| 5,245,427 A | * | 9/1993 | Kunihiro | .................. 348/409.1 |
| 5,321,440 A | * | 6/1994 | Yanagihara et al. | ...... 375/240.2 |
| 5,351,131 A | * | 9/1994 | Nishino et al. | .............. 386/109 |
| 5,381,275 A | * | 1/1995 | Nitta et al. | ..................... 360/48 |
| 5,404,168 A | * | 4/1995 | Yamada et al. | ......... 375/240.03 |
| 5,465,180 A | * | 11/1995 | Amada et al. | .............. 360/19.1 |
| 5,537,215 A | * | 7/1996 | Niimura et al. | .............. 386/111 |
| 5,546,191 A | * | 8/1996 | Hibi et al. | ................... 358/335 |
| 5,724,097 A | * | 3/1998 | Hibi et al. | .............. 375/240.04 |
| 6,192,190 B1 | * | 2/2001 | Tojo et al. | ................... 386/109 |
| 6,295,139 B1 | * | 9/2001 | Yamauchi et al. | ........... 358/444 |

FOREIGN PATENT DOCUMENTS

JP 1-278183 11/1989

* cited by examiner

*Primary Examiner*—Tung Vo
(74) *Attorney, Agent, or Firm*—Fitzpatrick, Cella, Harper & Scinto

(57) ABSTRACT

A digital signal coding apparatus for controlling the coding operation of a coding unit so as to obtain predetermined information amount and for recording into a predetermined recording packet. The apparatus has a control circuit to control the coding operation of the coding unit so as to generate a writing area of a predetermined amount in the recording packet.

7 Claims, 4 Drawing Sheets

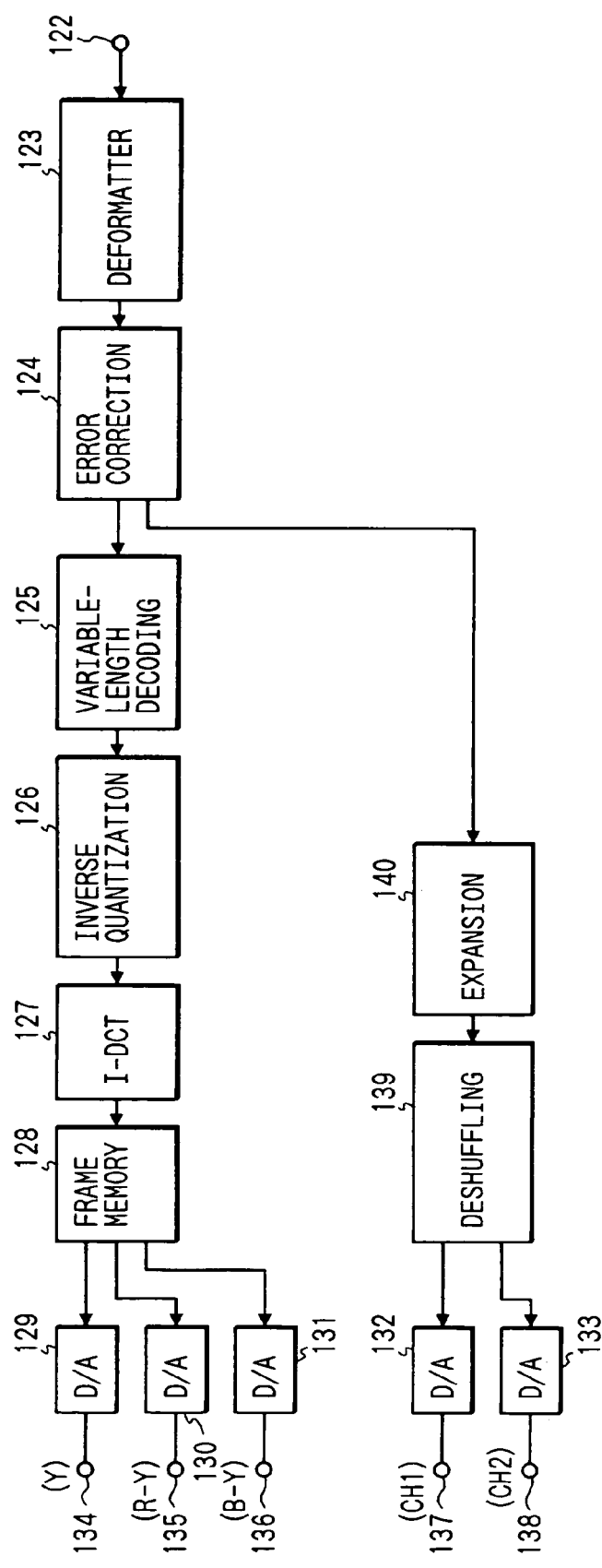

DIGITAL SIGNAL CODING APPARATUS

This application is a Continuation of Ser. No. 08/301,053, filed Sep. 6, 1994.

BACKGROUND OF THE INVENTION

1. Field of the Invention

The present invention relates to a digital signal coding apparatus for digitizing and compressing image data and for recording the compressed digital data to a magnetic tape or the like.

2. Related Background Art

Hitherto, in a digital VTR of the compression type, image data is high efficient coded and recorded. As a high efficient coding, image data which was orthogonal converted is quantized and the quantized data is coded by a variable length code. In this instance, in a code amount estimation unit, a quantization unit is adaptably changed and a coefficient of the quantization unit is decided so as to set a code amount to a predetermined rate. A correction code and information necessary for a block such as Sync, ID, and the like are added to the data which was set to the fixed rate. The resultant data is recorded to a tape medium as a sync block format.

On the other hand, generally, audio data is not compressed but an error correction code is added to the audio data. The resultant data is recorded into an audio area provided separately from the image data. In such a manner, the audio data has been determined by the format so as to be recorded at a determined position.

In the above conventional example, however, the position at which the audio data, image data, or the like is written has been decided by the format and an area to write data as necessary doesn't exist. Therefore, there is a drawback such that no data can be additionally written.

SUMMARY OF THE INVENTION

The present invention is made to solve such problems and it is an object of the invention to provide a digital signal coding apparatus which can write additional information without changing an inherent format.

According to an embodiment of the invention, there is provided a digital signal coding apparatus for controlling the coding operation of a coding unit so as to obtain a predetermined amount of information and for recording to a predetermined recording packet, wherein a control unit for controlling the coding operation of the coding unit so that a writing area of a predetermined amount is formed in the recording packet is provided.

According to the embodiment, since the writing area of a predetermined amount is formed in the recording packet, information of a relatively low rate other than the image data can be written into the writing area.

BRIEF DESCRIPTION OF THE DRAWINGS

FIG. 2 is a block diagram showing a schematic construction of a digital signal reproducing apparatus according to an embodiment of the invention;

DETAILED DESCRIPTION OF THE PREFERRED EMBODIMENT

An embodiment of a digital signal recording apparatus of the invention will be explained hereinbelow with reference to the drawings.

Figure 1:
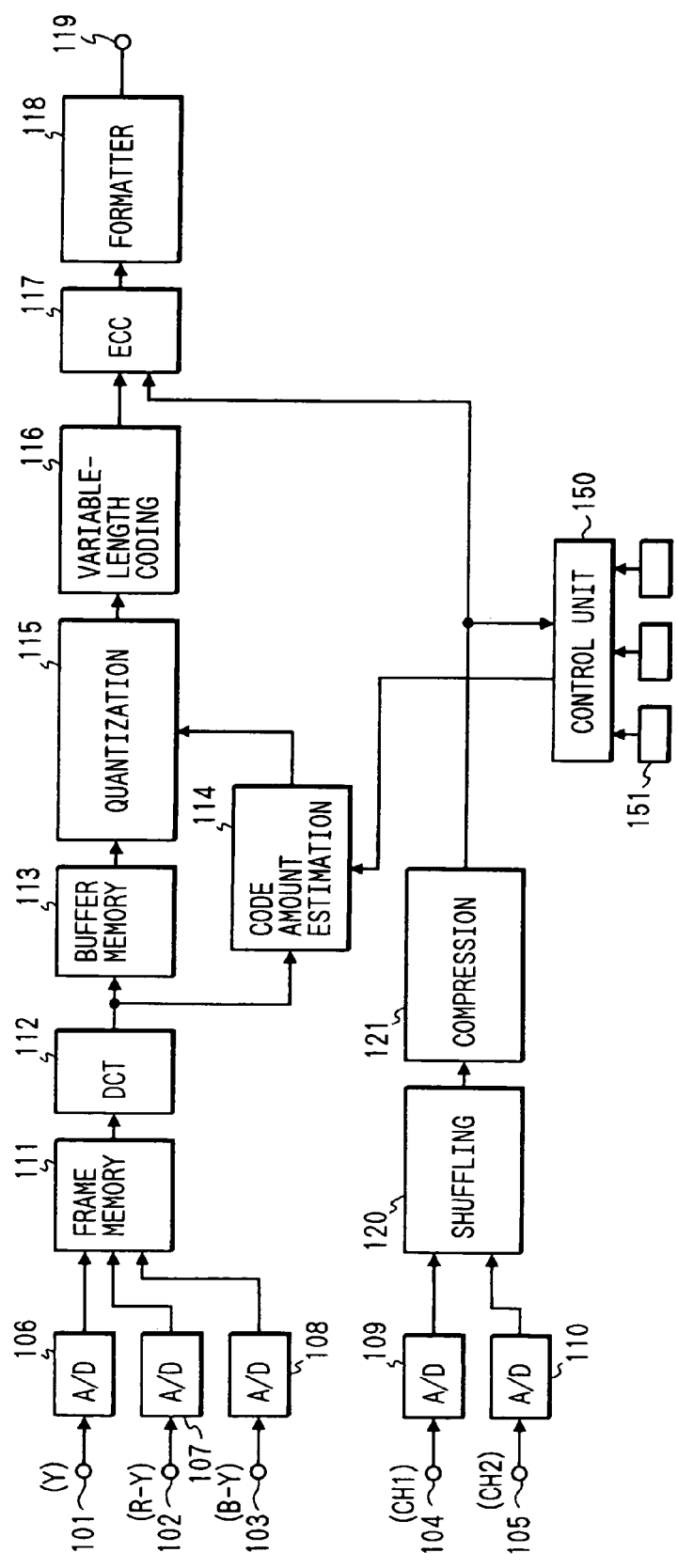
FIG. 1 is a block diagram showing a schematic construction of a digital signal recording apparatus according to an embodiment of the invention.

FIG. 1 is a block diagram showing a schematic construction of an embodiment in which a coding apparatus of the invention is applied to a digital signal recording apparatus such as a digital VTR or the like. FIG. 2 is a block diagram showing a schematic construction of a digital signal reproducing apparatus according to an embodiment of the invention.

In FIG. 1, reference numerals 101, 102, and 103 denote input terminals of component video signals Y, R-Y, and B-Y, respectively; 104 and 105 input terminals of audio signals; 106, 107, and 108 A/D converters for digitizing a video signal; 109 and 110 A/D converters for digitizing the audio signals; 111 a frame memory; 112 a DCT (discrete cosine transform) circuit; 113 a buffer memory; 114 a code amount estimation circuit; 115 a quantization unit; 116 a variable-length coding unit; 117 an ECC circuit for adding a correction code; 118 a formatter for rearranging data into a track format; 119 an output terminal to a recording unit (not shown); 120 a shuffling circuit of audio data; and 121 a compression circuit of the audio data.

Reference numeral 150 denotes a control unit for switching a target code amount in the code amount estimation circuit 114 in accordance with an optional mode. The control unit 150 designates the optional mode in accordance with the operation of an operation unit 151. The control unit 150 can also variably set the above-mentioned target code amount in accordance with an amount of compressed audio data output from the compression circuit 121.

In FIG. 2, reference numeral 122 denotes an input terminal from a reproducing unit (not shown); 123 a deformatter for rearranging from the track format; 124 an error correction circuit for correcting data generated on a transmission path; 125 a variable-length decoding unit (VLD) for demodulating the variable-length code; 126 an inverse quantization circuit; 127 an I-DCT (discrete cosine inverse transform) circuit; 128 a frame memory; 129, 130, and 131 D/A converters for video; 132 and 133 D/A converters for audio; 139 a deshuffling circuit for returning the shuffled audio data; 140 an expansion circuit of the audio data; 134, 135, and 136 output terminals of the component video signals Y, R-Y, and B-Y, respectively; and 137 and 138 output terminals of the audio signals.

The operation in the optional mode of the digital signal recording apparatus of the embodiment will now be sequentially explained.

The analog component video signals Y, R-Y, and B-Y input from the input terminals 101, 102, and, 103 are converted to the digital data by the A/D converters 106, 107, and 108, respectively and are written into the frame memory 111. When the written data is read out from the frame memory 111, it is converted into DCT blocks each consisting of (8×8) pixels and is read out.

In the digital VTR, in order to reproduce an image of a special reproduction such as a search or the like, a process is executed by fixedly setting a length of unit of the variable-length coding to a short unit. For example, in case of the embodiment, a luminance signal Y and a chroma signal C are combined and are set to a fixed rate on a DCT block unit basis of total 30 blocks. Namely, total six blocks are taken from the same position in a manner such that four DCT blocks are extracted for the luminance signal Y and one DCT block is extracted for each of the color difference signals R-Y and B-Y. Hereinlater, the six DCT blocks are called a "macro block". Five macro blocks are collected from remote positions on a picture plane and a unit of 30 DCT blocks is made.

The shuffling of the image data and the formation of the macro block are executed in the frame memory 111. The image data read out from the frame memory 111 is subjected to an orthogonal conversion by the DCT circuit 112 and is converted into a DCT coefficient in which an energy is deviated on one side. The DCT coefficient selects one kind of quantization unit by the code amount estimation circuit 114 so that the image data of the unit of 30 DCT blocks lies within a predetermined target data amount.

In the embodiment, for 16 quantization units which have been prepared, the information amount is calculated by executing the quantization and the variable-length coding and the optimum quantization unit adapted to obtain the target information amount is selected. The target information amount is set so that the information amount of 30 DCT blocks can be written in five sync blocks in the recording format.

Figure 3A:
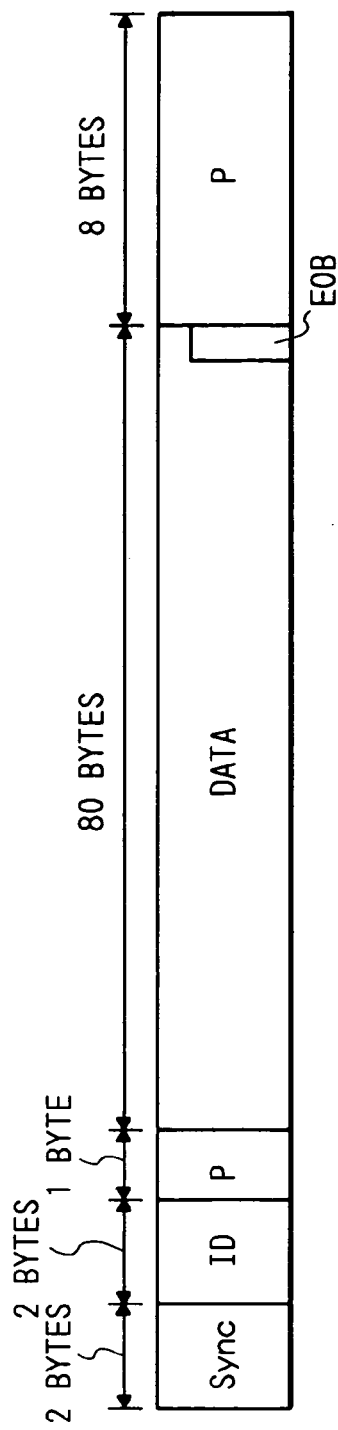
FIGS. 3A and 3B are diagrams showing sync block formats according to an embodiment of the invention.
Figure 3B:
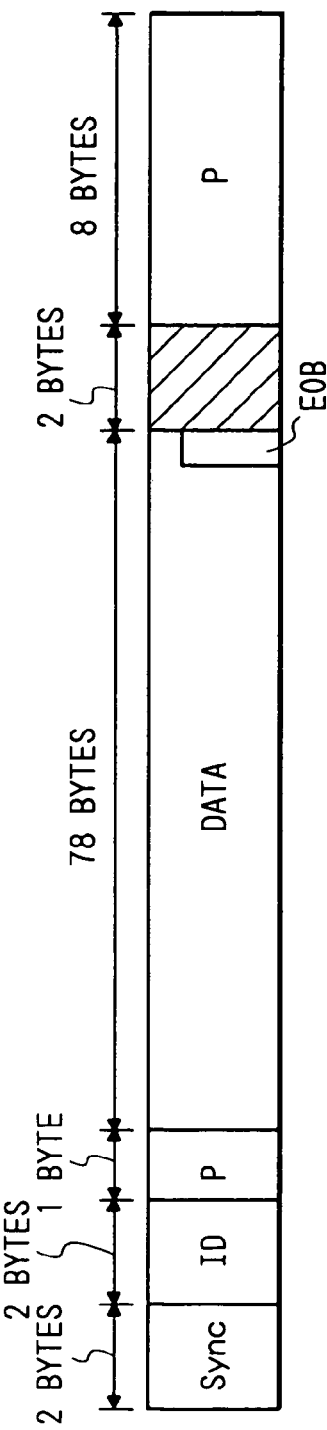
Figure 4:
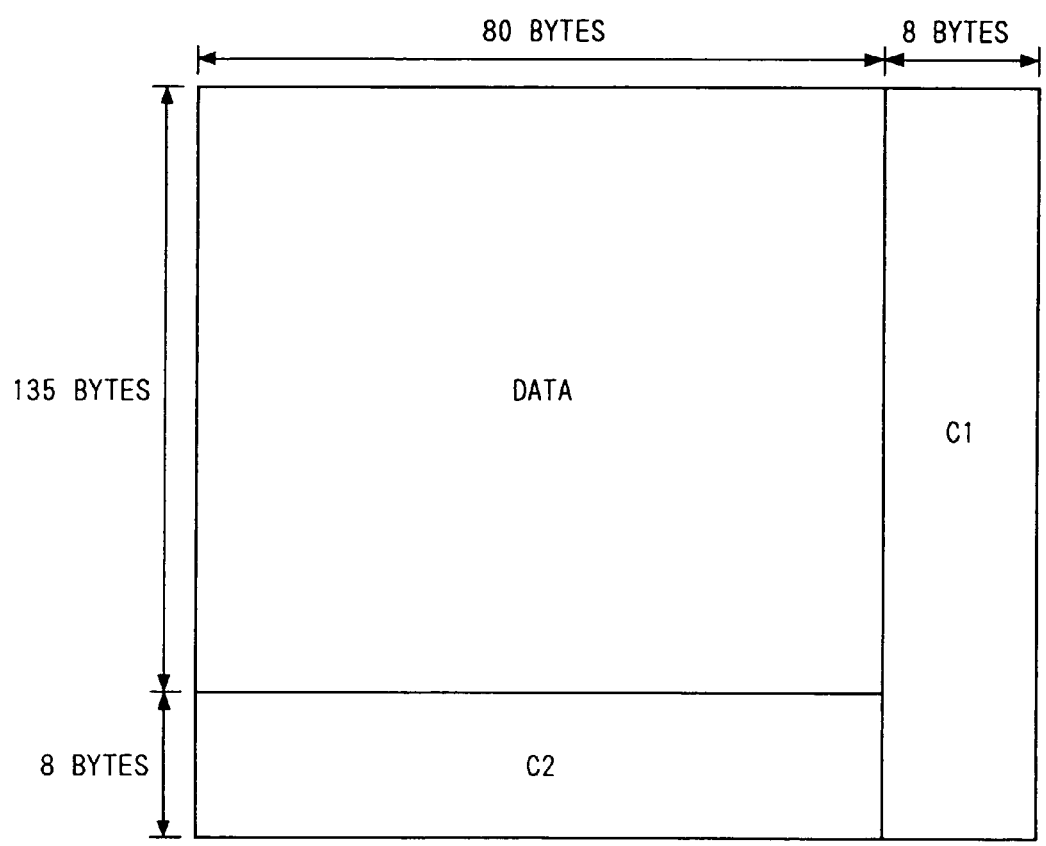
FIG. 4 is a diagram showing an ECC format according to an embodiment of the invention.

FIGS. 3A and 3B show a construction of the sync blocks of the embodiment. FIG. 4 shows an ECC format of data to be recorded in one track. In the embodiment, in case of the NTSC system, one frame is constructed by 10 tracks.

As mentioned above, 16 kinds of quantization tables are prepared and as the quantization No. is large, the data is coarsely quantized. Therefore, as a result of execution of the variable-length coding, as a large quantization No. is selected, the information amount is less.

In the embodiment, in case of a normal mode, since the image data is written in 80 bytes of the data area of the sync block shown in FIG. 3A, the target data amount is set to 400 bytes (=80 bytes×5 sync blocks) and the information of 30 DCT blocks is compressed within 400 bytes.

On the other hand, in case of the optional mode of the embodiment, since the audio data of two channels is additionally written together with the image data, as a capacity for such data, two bytes shown in a hatched portion in FIG. 3B are assured per sync block. Therefore, since it is necessary to write the image data into 78 bytes of the data region of the sync block shown in FIG. 3B, the information of 30 DCT blocks is compressed into 390 bytes (=78 bytes×5 sync blocks; the target data amount in the optional mode) and is written. That is, the code amount estimation circuit 114 selects the quantization No. of the quantization unit such that the target information amount of the image data doesn't exceed 390 bytes. The quantization unit 115 quantizes the image data held in the buffer memory 113 for a period of time of the coding amount estimation. The quantized data is variable-length coded by the variable-length coding unit 116 and is input to the ECC circuit 117.

On the other hand, the audio data of two channels is input from the input terminals 104 and 105 and is converted to the digital data of 48 kHz and 16 bits by the A/D converters 109 and 110. The digital data of two channels is distributed by the shuffling circuit 120 so that errors are distributed at random at the time of a burst error. The digital data is compressed to the data of about ½ by the compression circuit 121. As a compressing method in this instance, a method of a sub-band coding or the like can be considered.

In the sync block format as mentioned above, since the region to record the audio data of two bytes per one sync block is assured, the data can be recorded at a rate of 81 kBytes/sec (2 bytes×135×300 tracks/sec).

On the other hand, although the audio data is input at a rate of 192 kBytes/sec (48 kHz×16 bits×2 ch/8 bits/bytes), by compressing the data into ½.37, the data can be recorded as data of two bytes per one sync block.

The compressed audio data is input to the ECC circuit 117 and is written into the memory region of two bytes shown in the hatched portion in FIG. 3B and is converted into the sync block format. C1 and C2 parities shown in FIG. 4 are added to the converted data. The data is converted into the track format by the formatter 118 and is recorded to the recording unit (not shown) through the output terminal 119.

The operation in the reproducing mode will now be explained with reference to FIG. 2.

The reproduction data from the recording/reproducing unit (not shown) is input to the input terminal 122 and is converted from the track format by the deformatter 123. The error data generated on the transmission path is reconstructed to the original correct data by the error correction circuit 124. The audio data is input to the expansion circuit 140 and the image data is input to the variable-length decoding unit 125.

An identification code (EOB: End of block) is written in the image data written in the sync block every end of DCT block, so that the end of data of the DCT block can be detected. Therefore, by sequentially decoding the data of the variable-length code from the head of the sync block, a size of image data can be known and whether the audio data has been recorded or not can be discriminated.

The image data input to the variable-length decoding unit 125 is variable-length decoded and, after that, the decoded data is inversely quantized by the inverse quantization circuit 126 and is subjected to the inverse conversion of the DCT by the I-DCT circuit 127, thereby returning to the original image data. The data is deshuffled in the frame memory 128 and is sequentially read out in accordance with the order of the scanning lines. The luminance signal Y and the color difference signals R-Y and B-Y are returned to the analog data by the D/A converters 129, 130, and 131 and are output from the output terminals 134, 135, and 136.

The audio data input to the expansion circuit 140 is expanded by the expansion circuit 140 and is deshuffled by the deshuffling circuit 139 and is converted into the analog data of ch1 and ch2 by the D/A converters 132 and 133, respectively. After that, the analog data is output from the output terminals 137 and 138.

As mentioned above, according to the embodiment, the compression ratio of the image data is controlled and when the apparatus operates in the optional mode, the recording is executed at a compression ratio larger than the compression ratio at the time of the normal operation. Therefore, information such as audio data or the like can be additionally written into the space produced by such a compressive recording.

Although the embodiment of the invention has been described above, the invention is not limited to the foregoing embodiment but many effective variations and modifications are possible on the basis of the technical idea of the present invention. For example, although the above embodiment has been described with respect to the recording of the compressed audio data, information such as data for subcode, still image information, or the like can be recorded by using the invention irrespective of the format of the VTR so long as a rate of such information is relatively low.

In the above embodiment, by reproducing the image data and by detecting an amount of image data, the existence of the audio data is known. However, a signal indicative of the presence or absence of the audio data can be also recorded in a subcode area or in an ID area in the sync block.

Further, although the target data amount in the optional mode has been fixed in the above embodiment, the target data amount can be properly variably set in accordance with the compressive audio data. As a method of changing the compression ratio, not only the quantization level is changed but also it is possible to use another method such that a convolution coefficient of a convolution arithmetic operation of the output of the DCT circuit is changed or the like.

As described above, according to the embodiment, when the data is recorded into a predetermined recording packet, a predetermined amount of writing area can be generated. Therefore, additional information can be written without changing an inherent format and an additional value of the VTR can be raised.

What is claimed is:

1. A coding apparatus, comprising:
   (a) a first inputter, arranged to input image data;
   (b) a second inputter, arranged to input audio data;
   (c) a selecting unit, arranged to select one recording mode from among a first recording mode and a second recording mode, wherein the first recording mode is a mode for forming a recording sync block which includes the input audio data, the input image data which has been encoded, and parity check codes of a predetermined amount, and the second recording mode is a mode for forming a recording sync block which includes encoded image data and the parity check codes of the predetermined amount but does not include the input audio data;
   (d) a controller, arranged to set a target code amount for the encoded image data to be included in the recording sync block based on a recording mode selected by the selecting unit from among the first recording mode and the second recording mode;
   (e) an estimation unit, arranged to set a quantization level according to the set target code amount, wherein said estimation unit sets the quantization level so that an amount of encoded image data included in the recording sync block is less than or equal to the target code amount;
   (f) an encoder, arranged to encode the input image data by using the set quantization level;
   (g) a forming unit, arranged to form the recording sync block in accordance with the selected recording mode, wherein a length of the recording sync block is constant irrespective of the first recording mode and the second recording mode, and wherein a length of an encoded image data area included in the recording sync block varies in accordance with the first recording mode and the second recording mode; and
   (h) a transmission unit, arranged to transmit the recording sync block formed by said forming unit.

2. The apparatus according to claim 1, wherein said controller sets the target code amount according to an amount of the input audio data to be included in the recording sync block with the encoded image data generated by said encoder.

3. The apparatus according to claim 1, further comprising a compression unit, arranged to compress the input audio data.

4. A coding method, comprising the steps of:
   inputting image data and audio data;
   selecting one recording mode from among a first recording mode and a second recording mode, wherein, the first recording mode is a mode for forming a recording sync block which includes the audio data, the input image data which has been encoded, and parity check codes of a predetermined amount, and the second recording mode is a mode for forming a recording sync block which includes encoded image data and parity check codes of a predetermined amount, but does not include the input audio data;
   setting a target code amount for the encoded image data to be included in the recording sync block based on whether the selected recording mode is the first recording mode or the second recording mode;
   setting a quantization level according to the set target code amount, wherein said quantization level setting step sets the quantization level so that an amount of encoded image data included in the recording sync block is less than or equal to the target code amount;
   encoding the input image data by using the set quantization level;
   forming a recording sync block in accordance with the selected recording mode, wherein a length of the recording sync block is constant irrespective of the first recording mode and the second recording mode and wherein a length of an encoded image data area included in the recording sync block varies in accordance with the first recording mode and the second recording mode; and
   transmitting the formed recording sync block.

5. The method according to claim 4, wherein said target code amount setting step selects the target code amount according to an amount of the input audio data to be included in the recording sync block with the encoded image data generated by said encoding step.

6. The method according to claim 4, further comprising a step of compressing the input audio data.

7. A reproduction apparatus which reproduces data of the recording sync block formed using the coding method defined in claim 4.

* * * * *

UNITED STATES PATENT AND TRADEMARK OFFICE
CERTIFICATE OF CORRECTION

PATENT NO. : 6,993,072 B1
APPLICATION NO. : 08/778254
DATED : January 31, 2006
INVENTOR(S) : Makoto Shimokoriyama It is certified that error appears in the above-identified patent and that said Letters Patent is hereby corrected as shown below:

On the Title Page, Item
(56) References Cited U.S. PATENT DOCUMENTS
Insert the following: -- 5,504,759  4/1996  Inome et al. -- and -- 5,539,586  7/1996  Inome et al. --.

Signed and Sealed this

Eighteenth Day of September, 2007

JON W. DUDAS
*Director of the United States Patent and Trademark Office*